United States Patent Office 3,817,831
Patented June 18, 1974

3,817,831
PROCESS FOR PRODUCTION OF ALKALI
METAL SALT OF HEPARIN
Edward Mancilla, Chicago, Richard L. Peting, Hazelcrest, and Laverne W. Van Ness, Homewood, Ill., assignors to Wilson Pharmaceutical & Chemical Corporation, Chicago, Ill.
No Drawing. Filed Jan. 10, 1973, Ser. No. 322,450
Int. Cl. C12b 1/00
U.S. Cl. 195—7  8 Claims

ABSTRACT OF THE DISCLOSURE

Heparin-containing animal tissue, such as hog mucosa, is subjected to digestion action in an aqueous medium, to produce a heparin-containing digestion extract and the heparin recovery is accomplished by selectively passing a low molecular weight fraction of said digestion extract thru a semipermeable membrane to produce as a residuum a concentrate of proteins in which heparin is a component. Mucopolysaccharide complexes consisting predominantly of heparin complex are precipitated from the concentrate by addition of a quaternary ammonium salt. The quaternary ammonium salt complexes are dissolved in a salt solution and ethyl alcohol mixed with the salt solution in a volume sufficient to dissolve the quaternary ammonium salt component and thereby precipitate heparin in an alkali metal salt form.

BACKGROUND OF THE INVENTION

The present invention relates to the manufacture of an alkali metal salt of heparin. More particularly, it relates to a simplified process for recovering heparin from a solution obtained by digestion of animal tissues by producing a concentrate of the digestion solution under conditions to have a solute content consisting of compounds having a molecular weight exceeding about 7000. A quaternary ammonium salt is added to said concentrate to form a precipitate which is essentially a heparin complex, and the heparin salt is recovered from the precipitate by dissociation effected by dissolving said precipitate in a salt solution and adding an organic solvent to the salt solution of precipitate to form an organic solvent solution of the quaternary ammonium component of said complex and free the heparin in a relatively pure precipitated salt form.

Briefly, the present invention for producing an alkali metal salt of heparin involves the improvement in a process for recovering heparin from a heparin-containing digestion extract by precipitation of a quaternary ammonium heparin complex from said extract followed by separation of said complex from other components of said digestion extract and recovery of heparin from said complex, comprising concentrating said digestion extract prior to said quaternary ammonium precipitation by passage of a low molecular weight fraction of said digestion extract through a semi-permeable membrane adapted for selective passage therethrough of materials up to predetermined molecular weight to produce as a residuum and as a concentrate for said quaternary ammonium precipitation a concentrate of mucopolysaccharides of molecular weight exceeding about 7000.

Recovery of heparin from animal tissue has been a time consuming and expensive process. Generally, the methods of recovery require an autolysis and a digestion step to separate heparin from a protein-heparin complex obtained from the animal tissues. Isolating the heparin from the digestion solution has involved complicated operations, many of which involved forming quaternary ammonium salt-heparin complexes. A process such as is described in Mozen Pat. No. 3,058,884, treats aqueous animal tissue extract with relatively large amounts of water-soluble quaternary ammonium salts, i.e., 10 to 30 moles per $10^8$ heparin units to precipitate an insoluble mixture of complexes including heparin complex, directly from the extract, dissolving the mixture of complexes in a salt solution to effect fractionation thru selective dissolving and precipitating the free heparin with isopropyl alcohol in quantities effecting fractionation thru selective precipitation. Selective dissolving and precipitation of an unconcentrated digestion solution has the disadvantage of reducing the heparin recovery.

A process such as is described in Nazzareno Pat. No. 3,160,563, purifies heparin by dissolving a heparin-quaternary ammonium salt complex formed by a salt such as cetyl trimethyl ammonium bromide plus the associated impurity complexes in a 20% solution of sodium chloride, diluting the solution with distilled water to a NaCl content of 5% for fractional precipitation, dissolving the precipitate with a 20% solution of sodium chloride and limiting the dilution to a salt concentration insufficient to cause a second precipitation and then adding agents such as sulfocyanides to eliminate the organic base by precipitation and treating the resultant solution with acetone or alcohol to precipitate the heparin. If raw products have a low heparin percentage, the cyclic elution-reprecipitation by dilution-fractionation must be repeated 3 or 4 times and such steps markedly reduce the amount of originally available heparin ultimately recovered.

Now it has been discovered that an alkali metal salt of heparin of a relatively high activity can be prepared in a form readily purifiable to U.S.P. heparin without the need for a series of selective dissolution and precipitation steps requiring large amounts of organic solvents such as are required when the initial step of precipitation of heparin is from a digestion extract and involves a direct quaternary ammonium salt precipitation from a crude heparin solution, if the first step of treatment of the digestion solution is concentration thereof to approximately ¼ to ⅒ of the original volume by selectively passing a portion of said digestion solution through a semi-permeable membrane adapted for selective passage therethrough of materials of predetermined molecular weight to produce as a residuum, a concentrate of mucopolysaccharides of molecular weight exceeding about 7000. This concentration step eliminates low molecular weight materials capable of forming quaternary ammonium salt complexes and provides a solution of solutes whose reaction with quaternary ammonium salt gives a drastically improved heparin recovery from the product of complex precipitation obtained when the starting material is the original digestion solution or a concentrate of similar volume, prepared by such other concentration methods as heat treatment under vacuum. To the residuum of the concentration step of this invention there is added an aqueous salt solution containing a quaternary ammonium salt, preferably in quantities to introduce between 4 and 6 moles of quaternary ammonium salt per $10^8$ units of heparin content of said concentrate, to form an insoluble heparin-quaternary ammonium salt complex, isolating said complex, dissolving said isolated complex in an alkali metal salt solution and adding thereto sufficient water miscible organic solvent to dissolve said quaternary ammonium component of said complex and thereby precipitate said heparin in an alkali metal salt form.

Recovery of a pure heparin of a relatively high activity from the concentrate consisting essentially of heparin produced from the digestion solution may be effected by the quaternary ammonium salt precipitation and purification steps described in the prior art, such as in the Mozen and Nazzareno patents discussed above. Preferably, however, recovery of the heparin is effected by quaternary ammonium salt precipitation and recovery steps under conditions specifically selected in accordance with one aspect of this invention to provide heparin recovery in high yields, such as adding to the warm concentrate a warm aqueous solution of a quaternary ammonium salt such as cetylpyridinium chloride having a salt concentration of the order of magnitude of the concentrate, for example 0.3 molar salt concentration, to effect precipitation of complexes consisting essentially of heparin complex. The precipitate is isolated and then dissolved in a 3.0 molar sodium chloride solution at a temperature of about 120° F. to 130° F. A volume of water miscible organic solvent required to accept the entire quaternary ammonium component of the complex as a solute is added to the salt solution of said complex to thereby free the heparin component of the complex as an insoluble material, i.e., a precipitate in an alkali metal salt form, and recovering the heparin precipitate from the resultant solution of quaternary compound in the aqueous-organic solvent mixture.

The organic solvent precipitation may be repeated by dissolving the precipitated alkali metal salt of heparin in a solution of about 3 molar salt content and adding, for example, sufficient ethanol to form 45% ethanol by volume and produce a reprecipitate.

An alkali metal salt of heparin prepared according to the hereinafter described Example I, for example, having a potency of 106 units/mg. when subjected to conventional purification procedures such as decolorizing and filtration steps produce products having properties of the order of:

Potency—160 $\mu$/mg.
Percent yield—90
Color—at 400 mu.=.0539
Color—at 500 mu.=.0211
Color—at 580 mu.=.0141

More in detail, the complete process for recovery of heparin from, for example hog mucosa, consists of the steps comprising digesting animal tissue in an aqueous medium in two stages, concentrating the solution resulting from the two-stage digestion by passing a portion of it through a semi-permeable membrane, adding to the concentrate an aqueous solution of an alkali metal salt and of a quaternary ammonium salt to precipitate the heparin as a complex, dissolving the precipitated complex in a salt solution and reprecipitating the heparin from the complex by adding a water-miscible organic solvent to the salt solution of the complex to dissolve the quaternary ammonium component of the complex.

In the first stage of digestion, the aqueous medium contains inorganic acid in quantities to maintain a pH of less than 3. The digestion is carried out in a period of about 6 to 24 hours with the pepsin enzyme while maintaining a temperature of approximately 120° F.

In the second stage of digestion, the resultant suspension of the first stage is adjusted to an alkaline pH of at least 7.5 before adding activated pancreas thereto. The pancreas-containing suspension is incubated at a temperature of about 100° F. for about 5 to 15 hours. The undigested portions of the tissue are removed from the resultant suspension of the second stage by filtration to recover a solids-free digestion solution containing heparin as a component of the solute.

The digestion solution is then concentrated to approximately ¼ to ⅒ the original volume by passing a portion of the digestion solution through a semi-permeable membrane adapted for selective passage therethrough of the aqueous solvent plus solutes up to a predetermined molecular weight to produce as a residuum a concentrate of mucopolysaccharides of a molecular weight exceeding 7000 in which heparin is the desirable solute.

The salt content of the concentrate is checked and if it is not in the range of between 0.25 and 0.4 molar salt content, the salt content is adjusted.

After the concentrate having the specified molar salt content is warmed to a temperature in the range of about 40° C. to 45° C., an aqueous alkali metal salt solution having a salt content of the order of the concentrate, generally of 0.3 to 0.5 molar concentration and a temperature in the range of 40° C. and 45° C. and containing a quaternary ammonium salt such as cetylpyridinium chloride in amounts of about 2%, is added to the concentrate in quantities to introduce between 4 and 6 moles of quaternary ammonium salt per $10^8$ units of heparin content of said concentrate. The quaternary ammonium salt is reacted to form an insoluble quaternary ammonium complex material consisting essentially of heparin complex. The combined concentrate and added salt solution is incubated at a temperature in the range of 100° F. to 110° F. for a period of up to 16 hours to aggregate the insoluble complexes into non-sticky filterable solids. The solids consisting essentially of heparin complex is removed from the resultant solution.

Isolated complex precipitate is then dissolved in an aqueous salt solution having a salt concentration in the range between 3 M and 4 M (moles per liter) and a temperature in the range of 120° F. to 130° F.

The aqueous salt solution of heparin complex precipitate is mixed with a water-miscible organic solvent such as ethanol. Substantially anhydrous ethyl alcohol is added, for example, in quantities to produce a volume ratio of the order of 1.0 to 1.5 the volume of aqueous salt solution. The resultant alcohol-aqueous salt solution is a solvent in which the cetylpyridinium chloride component of the heparin complex is dissolved.

The heparin component freed from the complex by the dissolving of CPC is substantially insoluble in the resultant alcohol-aqueous salt solution and is precipitated in alkali metal salt form.

The alkali metal salt of heparin recovered from the alcohol-aqueous salt solution as a precipitate may be further purified by dissolving the precipitate in an aqueous solution of about 3 molar sodium chloride content and having a temperature in the range of 38° F. to 45° F. and adding thereto a volume of alcohol substantially equal to the volume of the aqueous sodium chloride solution to effect reprecipitation.

Concentration of the digestion solution and simultaneous withdrawal of solutes of a molecular weight less than about 7000 may be effected by ultrafiltration or dialysis.

Ultrafiltration is a process for separating molecular species by filtration through a colloidal filter or semi-permeable membrane. Ultrafiltration of the digestion solution may be effected for the purposes of the instant process using membranes identified in industry, for example, by the trade name Abcor 180 and 300. These membranes will allow solutes of molecular weight less than about 7000 and less than about 30,000, respectively to pass therethrough with water. The residua of such ultrafiltrations are concentrates retaining solutes of molecular weight exceeding the above set forth limits.

The Abcor 300 membrane is identified in trade literature as having a flux rate of 65 gal./day/ft.$^2$ with pure water at 10 p.s.i.g. At 10 p.s.i.g. it retains 70% of dextrin at a mean molecular weight of about 20,000 in a 0.02 wt. percent solution and it retains 85–88% of Carbowax at a mean molecular weight of 15,000 when filtered out of a 54 inch tube having an effective area of 1.1 ft.$^2$ at 25° C., 50 p.s.i.g. and a feed rate of 13.8 gallons/minute.

The Abcor 180 membrane is a finer membrane identified in trade literature as capable of retaining more than 90% of Carbowax at a mean molecular weight of 15,000 when filtered out of a 54 inch tube having an effective area of 1.1 ft.$^2$ at 25° C., 50 p.s.i.g. and a feed rate of 13.8 gallons/minute.

Dialysis, which is a process for separating molecular species by diffusion through a semi-permeable membrane, may be used as a substitute for ultrafiltration. Dialysis accomplishes a similar result relative to solutes but the residua of such operations have a volume of the order of two to three times those obtained by ultrafiltration.

To obtain a dialysis product of solute concentration equivalent to that of the ultrafiltration, it is necessary to reduce the volume of the dialysis residua by heat treament under vacuum.

Such a concentrate having the proper sodium chloride content is then processible by steps equivalent to those described as the steps following ultrafiltration.

The quaternary ammonium salts useful for precipitating heparin from an extract concentrate are quaternary salts derived from pyridine and its homologues such as collidine, wherein the heterogeneous nitrogen atom of the aromatic ring has attached thereto, a halogen ion such as chloride and bromide ion and an alkyl group of 12 to 20 carbon atoms such as, for example, a cetyl group, i.e., salts such as cetyl pyridinium chloride.

Precipitates may be recovered by various means such as centrifuging of suspensions or filtering with filter aids such as perlite.

The amount of cetylpyridinium chloride allowable for precipitation of heparin from salt solution of less than 0.5 molar salt concentration is 4 to 6 moles per 100 million units of heparin.

The advantages of the method of this invention can be recapitulated as follows:

(1) Minimal use of solvents and processing chemicals.
(2) Minimal steps to yield a relatively high potency product for purification to a U.S.P. heparin.
(3) High recovery of heparin available in raw material.

The following Example I illustrates a preferred embodiment of the invention. The examples are intended to be illustrative only and are not to be construed as setting forth limitations on the invention.

EXAMPLE I 10,235 pounds of porcine intestinal mucosa were pepsin digested by adding 52.5 gallons 20° Bé. hydrochloric acid and the equivalent of 200 pounds hog stomach linings. With an initial pH of 2.7, the mixture was agitated and held at 120° F. to 134° F. for 24 hours. The final pH was 2.9.

After digestion for 24 hours, 37 gallons of 50% sodium hydroxide and 9 gallons of liquefied phenol was added to the above mixture and the combination cooled to 100° F. 132 pounds of activated pancreas mixture was added to the combination and additional digestion carried out at a temperature of 100° F. for 12 hours with a digestion pH of 8.0. The product of the two steps of heparin digestion was adjusted to pH 5.5 using 18 gallons of glacial acetic acid. The pH adjusted product was heated to 180° F. and filtered. The filtrate volume was 1836 gallons. From the 1836 gallons of filtrate, a 50 gallon sample was withdrawn. On assay, the heparin potency was 55 u./cc. The 50 gallons of filtrate was reduced in volume to 10 gallons by ultrafiltration through a size 300 membrane made to permit the passage therethrough of solutes having molecular weight up to 30,000. After concentration, the heparin assay was 249 u./cc.±5% (average of two assays) and the sodium chloride concentration was 0.31 molar.

From the above concentrate, 650 cc. was removed for assay and precipitation. Assay of 236 u./cc.±5%. Total units 153,400. To the 650 cc. of concentrate warmed to about 40° C. was added 105 cc. of .3 M NaCl solution having a temperature of about 40° C. containing 3.15 grams of cetylpyridinium chloride (CPC). The resultant mixture was incubated at 40° C. for 16 hours to form a CPC heparin precipitate. The CPC heparin precipitate was collected by filtration and dissolved in 3 M NaCl solution having a temperature of 50° C. to establish a total volume of solution and wash of 250 cc. To this NaCl solution of CPC-heparin was added 250 cc. of 95% alcohol to dissolve the CPC and produce a heparin precipitate. The heparin precipitate was collected and dissolved in 80 cc. of 3 M sodium chloride solution and 80 cc. 95% alcohol added thereto. The collected heparin precipitate was dissolved in 50 cc. of de-ionized water having a temperature of 5° C. and the heparin precipitated by adding 50 cc. of 95% alcohol to the water solution. The resultant heparin precipitate was dissolved in 75 cc. of de-ionized water and 65 cc. of 95% ethyl alcohol added. After dissolution, filtration and drying the results are as follows: Yield—1.386 grams and potency of 106 u./mg.

EXAMPLE II

A heparin digestion solution prepared as described in Example I up to the point of the concentration thereof, except that its adjusted pH after filtration was 5.4 rather than 5.5. The product was split into sample A of 113.6 liters and sample B of 24 liters.

Sample A of 113.6 liters having a potency of 46 u./cc., i.e., totaling 5,223,000 units, was reduced in volume to a concentrate of 16.2 liters by ultrafiltration in a treatment period of 21 hours, through a size 180 membrane designed to permit the passage therethrough of solutes having molecular weight up to about 7000. The concentrate had a solids concentration of 19% and a potency of 295 u./cc. and totalled 4,779,000 units, showing that it retained 93% of the available heparin. The total volume of the liquid which penetrated the membranes was about 98 liters. The concentrate had a salt concentration of 0.34 M. This permeate was allowed to rise in temperature as it passed thru the size 180 membrane from 60° F. to 105° F. Portions of the permeate recovered at the temperatures of 69° F. and 80° F. and 105° F. showed substantial identical potency of heparin, and had a potency of 4.5 u./cc. indicating a loss of only 8% of the available heparin, checking within experimental error with the 93% recovery noted above.

16.0 liters of the above-described ultrafiltration concentrate having a total potency of 4,720,000 units and a sodium chloride molarity of 0.34 was mixed with 5 liters of a 0.30 M sodium chloride solution having a temperature of about 45° C. and containing 100 grams of cetylpyridinium chloride (CPC) (6 moles of CPC per $10^8$ heparin units) as a solute. The mixture was incubated at 50° C. for 16 hours. At the end of the incubation period, the precipitate formed therein was removed from the resultant liquid mixture by filtration thru a precoated Büchner funnel. The volume of 20 liters of permeate had a heparin potency of 5.4 units/cc. indicating a loss of heparin of about 2.3%. The precipitate was mixed into 1600 cc. of 3.0 M sodium chloride solution having a temperature of 60° C. and the Büchner funnel precoat was washed twice with 500 cc. of 3 M sodium chloride solution having a temperature of 40° C. The combination of solutions totaling 2600 cc. was mixed with 3900 cc. of 95% ethyl alcohol, a ratio which merely effects precipitation of heparin without substantial fractionation but effects dissolving of the CPC.

The precipitated alkali metal salt of heparin was dissolved in 800 cc. of 3 molar NaCl solution and filtered to effect clarity and the heparin reprecipitated by mixing 1200 cc. of 95% ethyl alcohol into the solution of alkali metal salt of heparin. The 45,000 mgs. of heparin precipitate isolated from the alcohol-water solution had a potency of 98 units per mg. which was a yield of 93.4% of the heparin rendered available by digestion.

EXAMPLE III

To illustrate the simplicity of the method of this invention over other methods in which digestion products are concentrated in a non-selective manner, sample B of Example II, having a volume of 24 liters was subjected to vacuum concentration at a temperature of 95° F. until a concentrate having a volume of 4 liters was recovered. The vessel then washed with hot water, increasing the total volume of concentrate to 4.5 liters.

The concentrate had a solids concentration of 63%, a potency of 218 units/cc. and sodium chloride molarity of 1.95 M.

One liter of the concentrate produced by vacuum concentration was mixed with 250 cc. of 0.30 M NaCl solution containing 4.57 grams of ceytlpyridinium chloride (6 moles of CPC per $10^8$ heparin units) as a solute and having a temperature of about 40° C. The mixture was incubated at 40° C. for 16 hours. At the end of the incubation period, the precipitate formed therein, was removed from the resultant liquid mixture by filtration thru a precoated Büchner funnel. The volume of 800 cc. of filtrate had a heparin potency of 196 u./cc. indicating the failure of CPC, under these conditions, to precipitate 72% of the heparin present in the concentrate, and thus only permits recovery of 28% of the heparin available in the digestion solution.

Various comparable aspects of the results obtained in Examples II and III were as follows and show the distinct advantages of the process of the instant invention:

TABLE I

|  | Example II (ultrafiltration concentration) | Example III (vacuum concentration) |
| --- | --- | --- |
| Starting material (heparin, μ/cc.) | 46 | 46 |
| Concentration ratio | 7/1 | 6/1 |
| Concentrate potency (heparin, μ/cc.) | 295 | 218 |

After cetylpyridinium chloride precipitation assay of the residual digest solution showed the following results:

|  | Example II (ultrafiltration concentration) | Example III (vacuum concentration) |
| --- | --- | --- |
| Heparin *not* precipitated by CPC (heparin, μ/cc.) | 5.4 | 196 |
| Percent heparin *loss* | 2.3 | 72 |

Comparison of the heparin products recovered as products of Examples II and III indicates that the process involving ultrafiltration has advantageous features.

To illustrate the superiority of the method of this invention over other methods wherein precipitation of heparin as a complex directly from a digestion solution is accomplished with high molar concentrations of cetylpyridinium chloride, a sample of digestion solution of Example I was processed as follows:

EXAMPLE IV

A sample of digestion solution obtained from the second digestion stage of Example I having a potency of 46 u./cc. was reduced in volume by ultrafiltration to a concentrate having a potency of 236 u./cc. and salt molarity of 0.31 M by ultrafiltration thru a size 180 membrane designed to permit the passage therethru of solutes having molecular weight up to 7000 and split into concentrate portions A and B.

Concentrate portion A of 650 cc. containing a total of 153,400 heparin units was mixed with 200 cc. of 0.31 M aqueous NaCl solution containing 39 grams of cetylpyridinium chloride (equivalent to 10.9 moles of CPC per $10^8$ heparin units) and the resultant mixture of liquid and solids precipitate was incubated at 40° C. for 16 hours.

At the end of the incubation period, the precipitate formed therein, was removed from the resultant liquid mixture by filtration thru a precoated Büchner funnel. The precipitate was mixed into 3.0 M sodium chloride solution having a temperature of 50° C. and filtered to remove the filter aid. The Büchner funnel precoat (filter aid) was washed with 3 M sodium chloride solution having a temperature of 50° C.

The combination of solution of complex plus filter and wash water totaling 250 cc. was mixed with 250 cc. of 95% ethyl alcohol to effect precipitation of heparin.

The precipitated alkali metal salt of heparin was removed from the aqueous NaCl-alcohol solution and dissolved in 80 cc. of 3 M sodium chloride solution. The 80 cc. of solution was mixed with 80 cc. of 95% ethyl alcohol to reprecipitate the alkali metal salt of heparin.

The reprecipitated heparin salt was dissolved in 50 cc. of distilled water having a temperature of 41° F. and the solution was mixed with 50 cc. of 95% ethyl alcohol to precipitate heparin salt.

Precipitate recovered by filtration was dissolved in 75 cc. of distilled water having a temperature of 41° F. The solution was mixed with 65 cc. of 95% ethyl alcohol to produce a third precipitate.

The third precipitate recovered by filtration was mixed into distilled water having a temperature of 41° F. The solution was passed thru a fine filter to remove any undissolved solids and then the solution was dehydrated by freeze drying.

The yields of these steps was 2.802 grams of heparin having a potency of 45 u./mg.

Concentrate portion B of 650 cc. containing a total of 153,400 heparin units was mixed with 200 cc. of 0.31 M aqueous salt solution containing 29 grams of cetylpyridinium chloride (CPC) (equivalent to 5.6 moles of CPC per $10^8$ heparin units). The resultant mixture of liquid and solids precipitate was incubated at 40° C. for 16 hours.

At the end of the incubation period, the precipitate, formed therein, was removed by filtration thru the precoated Büchner funnel. The precipitate was subjected to an identical number and type of solubilizing and ethyl alcohol precipitating steps and the identical dehydration procedure used to obtain the product of concentrate portion A.

The yield of precipitation from the concentrate with a CPC quantity in the range specified in the instant application was 1.386 grams with a potency of 106 u./mg., i.e., a potency of about 2.35 times that of the product recovered by precipitation with 10.9 moles of CPC per $10^8$ units of heparin.

We claim:

1. In a process for recovering heparin from an animal tissue heparin-containing enzyme digestion extract by precipitation of a quaternary ammonium heparin complex from said extract followed by separation of said complex from other components of said digestion extract and the recovery of heparin from said complex, the improvement which comprises concentrating said digestion extract prior to said quaternary ammonium precipitation by passage of a low molecular weight fraction of said digestion extract through a semi-permeable membrane adapated for selective passage therethrough of materials of predetermined molecular weight to produce as a residuum and as a concentrate for said quaternary ammonium precipitation, a concentrate of mucopolysaccharides of molecular weight exceeding about 7000.

2. A process according to claim 1 wherein said quaternary ammonium precipitate is achieved by introduction of from 4 to 6 moles of quaternary ammonium salt per $10^8$ units of heparin content of said concentrate.

3. A process for production of an alkali metal salt of heparin which comprises digesting heparin-containing animal tissue in a first stage in an aqueous medium at a pH of less than 3, in the presence of pepsin enzyme, further digesting the product of said first stage digestion in a second stage, after adjusting the pH of said product to a minimum alkaline pH of 7.5 and introducing activated pancreas thereto, said digestion producing a digestion solution containing some undigested solids, removing said undigested solids from said digestion solution, passing said digestion solution through a semipermeable membrane adapted for selective passage therethrough of solutes of predetermined molecular weight, to produce as a residuum a concentrate of mucopolysaccharides of molecular weight exceeding about 7000, adding to said concentrate having a temperature in the range of about 40° C. to 45° C., an aqueous alkali metal salt solution of 0.3 molar salt concentration having a temperature in the range of 40° C. to 45° C., containing a quaternary ammonium salt in quantities to introduce between 4 and 6 moles of quaternary ammonium salt per $10^8$ units of heparin content of said concentrate to form an insoluble or quaternary ammonium complex isolating the water-insoluble quaternary complex material, dissolving said complex material in an alkali metal salt solution and adding, thereto sufficient water miscible organic solvent to dissolve the quaternary ammonium component of said complex and thereby precipitate said heparin in an alkali metal salt form.

4. A process for recovery of heparin according to claim 2, wherein the mixture of proteins containing heparin as the preponderate organic material is produced by steps comprising digesting animal stomach linings in aqueous medium in two stages, the aqueous medium in the first stage containing inorganic acid in quantities maintaining a pH of less than 3 and pepsin enzyme adjusting the suspension product of stage 1 to a minimum alkaline pH of 7.5, adding activated pancreas to the suspension, incubating said mixture at a temperature in the range between about 100° F. and 110° F. for about 16 hours, removing the undigested portions of the stomach linings from the suspension produced in the second stage of digestion to recover the extract which has to be concentrated.

5. A process according to claim 3, wherein the residuum of semi-permeable membrane treatment of said digestion extract has a volume in the range of ¼ to ¹⁄₁₀ of the volume of digestion extract fed to the concentrate step.

6. A process according to claim 5, wherein the semi-permeable membrane treatment of the extract is an ultrafiltration step and the volume reduction achieved is to at least ¼ the volume of the extract fed thereto.

7. A process according to claim 3, wherein the semi-permeable membrane treatment is a dialysis step and volume reduction of the product of dialysis to the specified range is achieved during a subsequent vacuum evaporation step.

8. A process according to claim 3, wherein said mixture containing added salt solution of quaternary ammonium salt to form an insoluble complex is incubated at a temperature of about 40° C. for 16 hours to effect aggregation of the reaction product complexes into filterable solid materials.

References Cited
UNITED STATES PATENTS
2,884,358   4/1959   Bush _____ 195—7

ALVIN E. TANENHOLTZ, Primary Examiner

U.S. Cl. X.R.
210—22; 260—211 R